Patented Aug. 30, 1927.

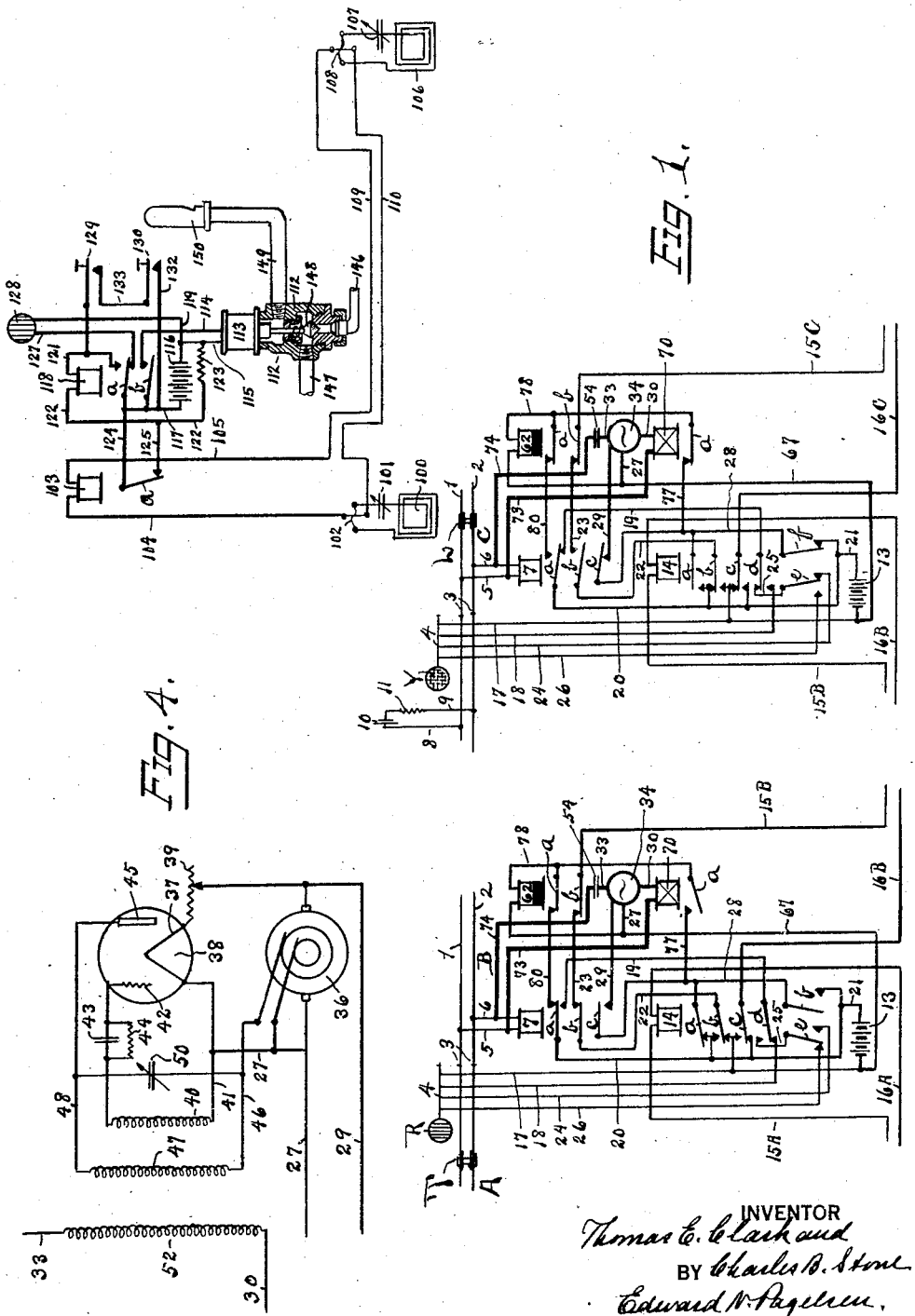

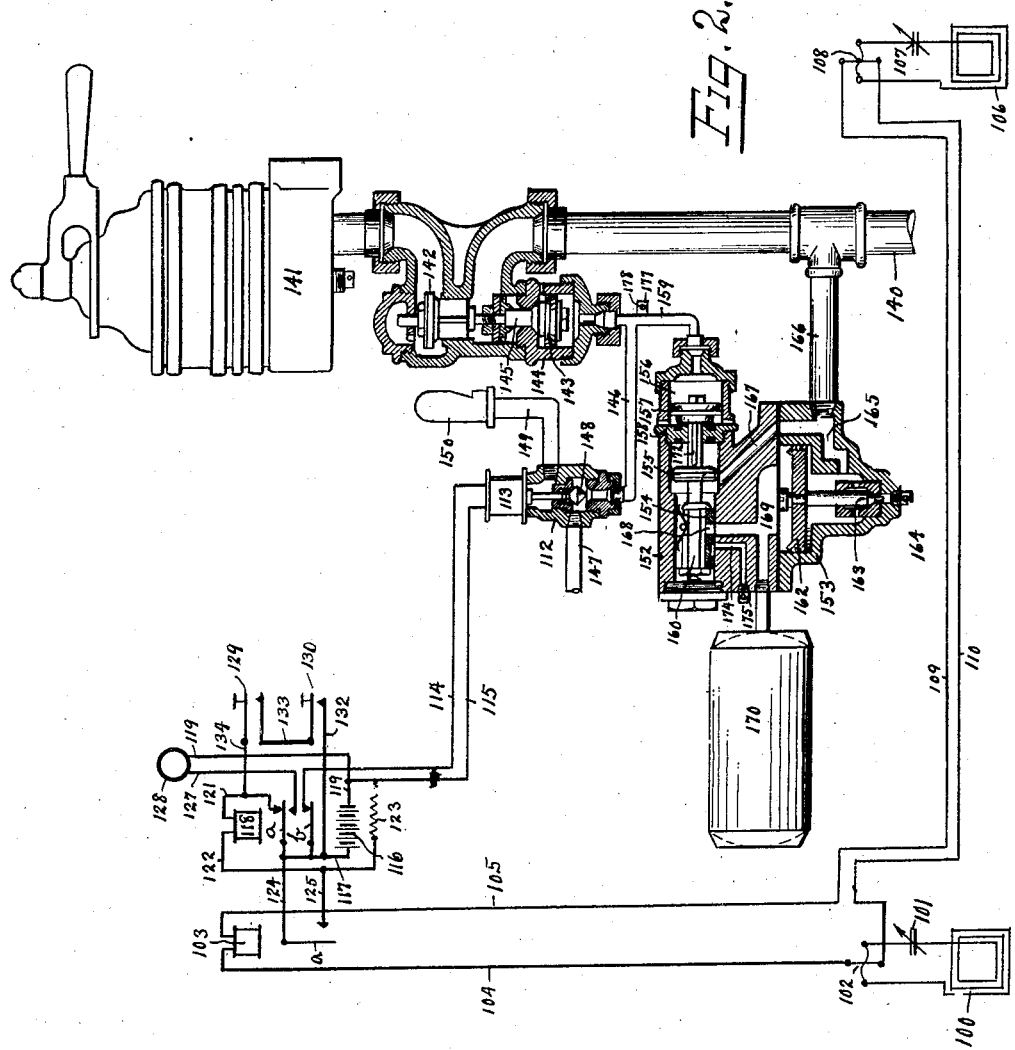

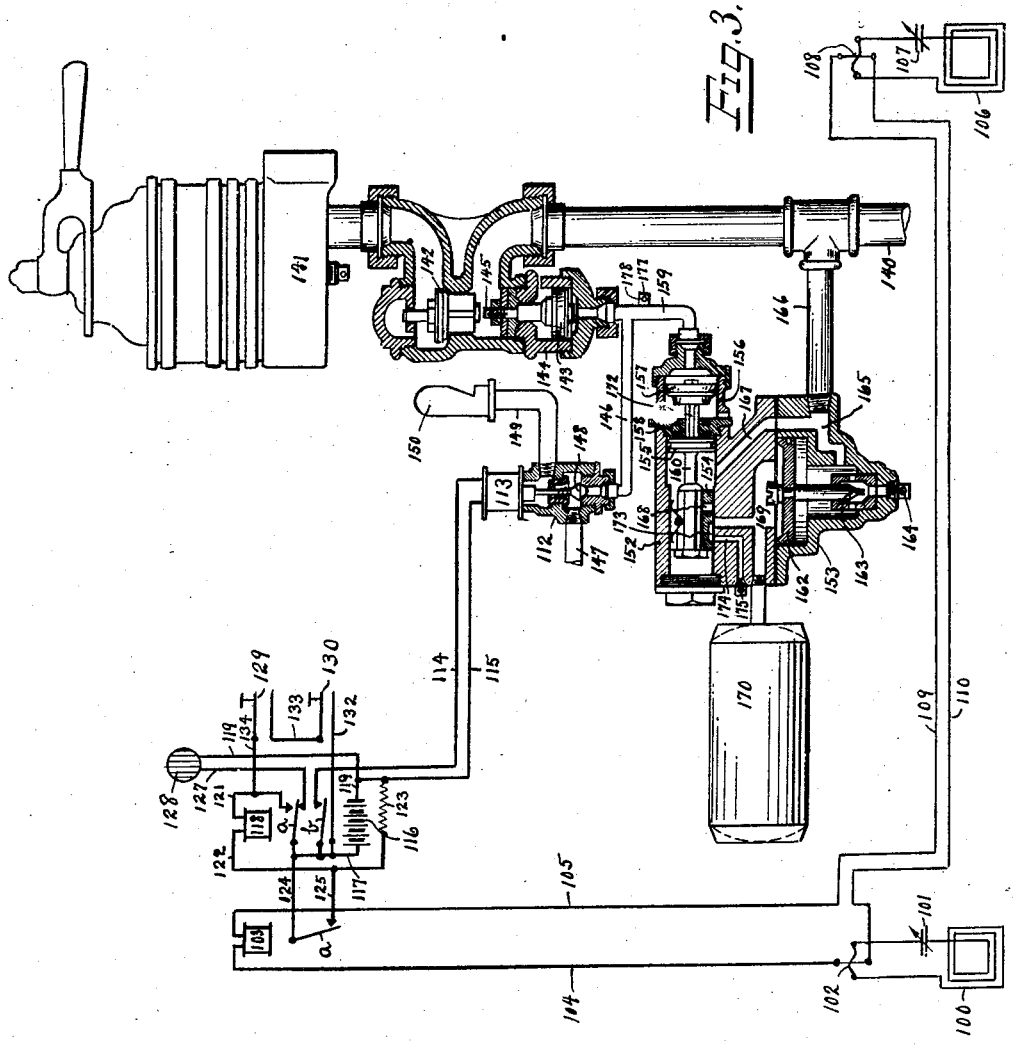

1,640,480

UNITED STATES PATENT OFFICE.

THOMAS E. CLARK AND CHARLES B. STONE, OF DETROIT, MICHIGAN, ASSIGNORS TO CONTINUOUS TRAIN CONTROL CORPORATION, OF DETROIT, MICHIGAN, A CORPORATION OF MICHIGAN.

AIR-BRAKE-CONTROL DEVICE.

Application filed June 24, 1925. Serial No. 39,214.

This invention relates to means for automatically controlling the operation of railway trains and is designed to cooperate with any of the usual automatic wayside signals and the so-called "approach light" block signal systems, and its object is to cause trains to be stopped in a block when the signal light at the exit end thereof indicates that the next or second block in advance is occupied.

This invention consists of instrumentalities on a locomotive embodying a collector coil and a resonant circuit therefor tuned to the wave length of current propagated in the track rails by a transmitter of high-frequency oscillating currents, a current source and an electric brake-controlling valve mechanism normally energized thereby, and means whereby the circuit between the current source and the valve mechanism may be interrupted whenever current is generated in said coil circuit because of the current propagated in the rails, in combination with pneumatically operated means for normally preventing the escape of the train line pressure of the air brake system, the conduit for the air under pressure connecting to said pneumatically operated means being interrupted by said valve mechanism when de-energized so as to permit the escape of air from the train line pipe.

It further consists of the details of construction illustrating the accompanying drawings and particularly pointed out in the claims.

In the drawings, Fig. 1 is a diagram of two signal and control stations adapted to propagate high-frequency oscillating currents in the rails of a track. Figs. 2 and 3 are diagrams of the wirings of instrumentalities mounted on a locomotive and vertical sections of the pneumatically operated means for releasing the air pressure in the train line pipe, the two figures showing the parts in their normal and pressure-releasing positions respectively. Fig. 4 is a diagram of a current transmitting mechanism.

Similar reference characters refer to like parts throughout the several views.

The track indicated by the lines 1 and 2 is a one way track of a double track system, and is divided into blocks by means of the usual insulations 3. Traffic is in one direction only, that is, from right to left in Fig. 1 and each block is provided with a signal and control station connected to its rails at its exit end, and each station is controlled by the train, if any, occupying the block of said station and one of the three blocks in advance. A signal stand at each station is provided with the usual green, yellow and red lamps, which receive current only when the block to which said station is connected, is occupied, so that there is no unnecessary loss of current. When a block is occupied by a train, the red lamp burns at its exit end when the next block in advance is occupied, a yellow light burns when the second block in advance is occupied, and a green light burns when the next two blocks in advance are unoccupied. The several parts of each signal installation may be said to be in "clear", "caution" or "danger" positions when the green, yellow or red lamp respectively burns at its lamp stand 4.

The wires 5 and 6 connect the track relay 7 of each block to its rails and current for the relay is conducted to the rails of each block by the wires 8 and 9 from the track battery 10, the resistance 11 being employed to prevent damage to the battery when a car axle on the rails short circuits the track relay. The relay 7 when energized holds up its armatures $a$, $b$ and $c$ and thereby holds open these circuits to the several signal lamps and the circuit from the battery to the train control mechanism, the common connector between the signal lamps and the current source being always closed. But when this relay 7 is de-energized by reason of its block or track section being occupied, its armatures will close the circuit to the proper lamp and to the train control mechanism so that the lamp and the train control mechanism will function.

Each signal installation is controlled by the signal installation next in advance so that if the parts of one signal installation are in "danger" positions the parts of the installation next in the rear will assume "caution" positions and in turn will cause the parts of the second station in the rear to assume "clear" positions. No station or installation has any effect on the stations in advance.

The sections and their installations are lettered A, B, and C in Fig. 1 and these letters are occasionally associated with the numerals designating different parts of the installation. The armatures of the several relays will be designated by the numerals of the relays together with small letters for the armatures. Each section has a battery or other current source 13 and the circuits which are employed in the signal system are shown by light lines and those circuits which belong to the train control mechanism are shown by heavy lines. The circuits are controlled in part by a polar neutral relay 14 whose winding is connected to the installation next in advance by wires 15 and 16. Current flows to this relay 14 from the station next in advance over wire 15 and back over wires 16 when "clear" conditions control, and flows in the opposite direction when "caution" conditions control, and no current flows over these wires when "danger" conditions control. The relay 14 has neutral armatures $a$, $b$, $c$ and $d$, and also has polar armatures $e$ and $f$. For convenience it will be assumed that positive current flows to the relay 14 of each station over the wire 15 thereto when the parts of that installation are to be at "clear" positions, and that this causes the armatures $e$ and $f$ to swing clockwise, while negative current flows over this wire 15 when the installation is to be at "caution," at which time these armatures $e$ and $f$ swing counter-clockwise. Block A was clear until the train T passed the signal station B, and the insulations 3 dividing the blocks A and B, so that the polar armatures $e$ and $f$ of relay 14 of station B are still in the positions they assumed when positive current came to this relay 14 over the wire $15^A$. But when the train entered this block A, relay 7 of block A was short circuited and therefore no current flowed over wire $15^A$ to station B. If there were a train in block B, current would flow from battery $13^B$ to the lamp stand, relay 7 then being de-energized. The circuit is from the battery 13 over wire 17 to the lamp R and back over wire 18, armature $14^d$, wire 19, armature $7^a$, wires 20 and 21 to the battery. It will be noticed that armature $14^d$ is in its lower position because the relay 14 is deenergized on account of receiving no current from the battery of the station ahead.

If the two blocks in advance of block B were unoccupied and a train entered block B, current would flow from battery $13^B$ over wire 17 to the green lamp, thence over wire 26 to polar armature $14^e$ wire 25, armature $14^d$, wire 19, armature $7^a$ and wires 20 and 21 to the battery.

At station C, block C being occupied, current flows from the battery over wire 17 to yellow lamp Y, and over wire 24, polar armature $14^e$, wire 25, armature $14^d$, wire 19, armature $7^a$ and wires 20 and 21 to the battery.

The circuits to relays 14 are as follows: beginning with the negative of battery $13^B$, then over wire 17, armature $14^b$, wire 22, armature $7^b$, wire 23, armature $b$ of relay 62 (which will be explained later on) and wire $15^B$ to relay $14^C$, thence over wire $16^B$, armature $14^e$ of station B, and wires 20 and 21 to the battery. This causes armatures $14^e$ and $14^f$ to swing counter-clockwise. The current is described as always flowing to each relay 14 over wire 15, and may be either positive or negative.

If block C were unoccupied and relay 7 energized, current would flow from the positive of battery $13^C$ over wires 21 and 20, relay $14^B$, wire 22, armature $7^b$, wire 23, armature $62^b$ and wire $15^C$ to relay 14 of the next station in the rear. But because block C is occupied, this circuit is opened by armature $7^b$ and no current passes to relay 14 of that station.

Therefore when positive current flows over a wire 15 to a relay 14 of an occupied block the green lamp at the exit end of that block becomes visible. When negative current flows over this wire to a relay 14, the adjacent yellow lamp becomes visible, and when no current flows over this wire 15, a red lamp becomes visible.

The high-frequency current of predetermined wave length is propagated in the section at whose exit end a red lamp receives current and also in the section at whose exit end a yellow lamp receives current, and the length of track which carries a sufficient amount of this current to affect instrumentalities installed on the locomotive or other vehicle traveling along the track will depend upon the wave length and upon the volume of current impressed upon the rails. One form of transforming and transmitting device is diagrammatically shown in Fig. 4, and the circles 34 in Fig. 1 indicate such transforming and transmitting devices. Current is conducted to such transmitting device only when either of the two blocks in advance is occupied, that is, when negative current passes to the relay 14 from the station in advance or when no current passes to this relay, and it furthermore occurs only when the block belonging to that transmitter is occupied, and therefore when no current passes to the relay 7 of that block.

Our transformer embodies a motor generator 36 and the wires 27 and 29 connect thereto and to the filament 37 of the vacuum tube 38, an adjustable resistance 39 being provided in the filament circuit to control temperature. The wire 27 also carries high-voltage current from the motor generator to the grid coil 40 to which it connects by means of the wire 41, and the condenser 43 and the grid leak 44 connect this coil 40 to the grid 42.

The circuit to the plate 45 consists of the wire 46, plate coil 47, and wire 48, and this coil is shunted by the variable condenser 50 whereby the oscillations may be limited to a predetermined wave length, and these oscillations are transmitted to the wires 30 and 33 through the output coil 52, this current output being materially increased upon the near approach of a vehicle whose axle short circuits the track and builds up a strong magnetic flux in the transformer-relay 70, sufficient to cause it to attract its armature $a$.

If block B were occupied, current would flow from the battery over wires 21 and 20, armature $14^a$, wire 28, armature $7^c$, wire 29 to the transformer 34, wire 27 and 67 to the battery. This circuit is always closed when the block to which the installation belongs is occupied and the block next in advance is also occupied, that is, whenever no current is received over the wires 15 and 16.

When the parts are as shown at station B, the relay 7 being energized, the circuit between armature $7^c$ and wire 29 is broken so that the transformer 34 receives no current.

When the parts are as shown at station C, the relay 14 being energized and relay 7 de-energized, current flows from the battery over wires 21 and 20, armature $14^f$, wire 28, relay $7^c$, wire 29, transformer 34, and wires 27 and 67 to the battery. If the armatures $14^e$ and $14^f$ had been in their clockwise or "clear" positions, no connection would have been made with the wire 20 by either armature $14^f$ or $14^a$.

The transmitter output coil 52 connects to a condenser 54 by means of the wire 33 and then to the rail 2 through wires 74 and 6. This condenser prevents the passage of direct currents. The wire 30 connects to the relay 70 and wires 73 and 5 connect this relay to the rail 1. Whenever the relay 70 is energized by the current from the loading coil 52, it attracts its armature $a$, closing the circuit to the slow-release relay 62 over wires 77, 78 and 67. Therefore, so long as this transformer functions properly while its block is occupied, the circuit to relay 14 of the block to the rear is closed at armature $62^b$. The armature $62^a$ being attracted, it closes the circuit over wires 67, relay 62, wire 78, armature $62^a$, wire 80, armature $7^a$ and wires 20 and 21. As soon as the block is occupied, this last circuit is opened by armature $7^a$, but if the transmitter functions properly, then the first named circuit is closed. But if the transmitter fails to function, the circuit to relay 62 will open and no current will then flow to relay 14 of the next station in the rear, resulting in a "danger" lamp showing at that station and the circuit being closed to the transmitter of that block.

*The locomotive installation.*

The locomotive installation is shown in Figs. 2 and 3 in two positions, in the former in inoperative and in the latter in operative position. The collector coil 100 is mounted at the front end of the vehicle just in front of the leading axle and inclined to the vertical so as to cut the lines of magnetic flux between the rails and the circuit of this coil is tuned to the current in the rails by means of the adjustable condenser 101. The high-frequency oscillating current is converted by the thermo-couple or junction 102 of any desired type, which connects to the windings of the relay 103 by means of wires 104 and 105. If desired, another collector coil 106 may be installed just back of the rear axle of the tender and the circuit of this coil may be tuned to the circuit of coil 100 by means of the condenser 107. The thermo-couple 108 connects to the wires 104 and 105 by wires 109 and 110.

An electro-pneumatic valve 112 is controlled by a solenoid 113 which connects to the battery circuits by means of wires 114 and 115. So long as this solenoid is energized, the automatic brake control will be held inoperative, but when the solenoid is de-energized, the control mechanism causes the operation of the brakes. A battery 116 supplies current for the various operations and normally, current flows from the battery over wire 117, armature $b$ of relay 118, and wire 114 to the solenoid, and then back over wires 115 and 119. Relay 118 is energized by current over wire 117, armature $118^a$, wire 121, and then back over wire 122, resistance 123 and wires 115 and 119.

When one of the collector coils picks up sufficient current to cause relay 103 to swing its armature $a$, a short circuit over wires 117 and 124, armature $103^a$, wires 125 and 122, resistance 123, and wires 115 and 119 is established and the armatures assume the positions shown in Fig. 3. Current now flows from the battery over wire 117, armature $118^a$, wire 127 to signal lamp 128 and over wire 119 to the battery. At this time the solenoid is de-energized and the brakes begin to go on.

Two forestalling keys 129 and 130 are provided so that the engineer and fireman, by simultaneously depressing these keys, may prevent this application by closing the new circuit to relay 118 over wires 117 and 132, key 130, wire 133, key 129 and wires 134 and 121 to the relay. The re-energized relay picks up its armatures and closes the circuit to the solenoid which immediately closes the valve 122.

The brake mechanism shown in the drawings connects to the train pipe 140 and serves to relieve the air pressure therein and thus causes application of the brakes. An engineer's brake valve 141 connects to the upper end of this pipe in the usual manner. The check valve 142 is normally held in the position shown in Fig. 2 by the piston 143, slidable in cylinder 144, and the piston rod 145 connected thereto. Pressure underneath this piston is received from pipe 146 which connects to the electro-pneumatic valve body 112, the valve being held open by the solenoid 113. This valve body connects to the main pressure tank of the air-brake system by means of a pipe 147. When the solenoid becomes deenergized, the pressure below the piston 143 soon becomes dispelled because of leakage, and the piston 143 and valve 142 move to the position shown in Fig. 3, when the valve 142 prevents recharging of the train-pipe through the engineer's valve, but it does not prevent the engineer from applying the brakes.

When the valve 148 is seated to cut off flow of air to the pipe 146, it opens a passage from the pipe 147 to the pipe 149 of the whistle 150 which sounds immediately after the lamp 128 indicates the presence of high-frequency current in the rails occupied by the locomotive and this sounding of the whistle indicates that the brakes will be applied within a few seconds, depending upon the control openings to be hereafter described.

A chamber 152 is formed in the valve body 153, and in it are slidable a slide valve 154 and a piston 155. A cylinder 156 connected to the valve body contains a piston 157 which is normally held against the head 158 by air pressure carried to the cylinder 156 by means of the pipe 159. The piston rod 160 connects the two pistons and slide valve.

In the valve body is a piston 162 connecting to a stem which terminates in a valve 163 which normally closes the passage to the discharge opening 164. A passage 165 in this body connects the branch 166 of the train pipe 140 to the space below piston 162. A passage 167 connects the passage 165 to the interior of the valve chamber and a port 168 in the slide valve 154 permits air to pass freely to the space 169 above the piston 162 and to the reserve tank 170, which results in the same pressure below and above the piston 162 and in this tank 170. As the piston 157 has a slightly greater area than piston 155, and as the pressure in the pipe 146 is usually slightly greater than in the train pipe 140, the parts will normally be in the positions shown in Fig. 2.

When pressure in pipes 146 and 159 is relieved, the parts take the positions shown in Fig. 3, the pressure on the piston 155 serving to press it against partition 158. Any pressure which may have accumulated between the piston 155 and this partition can escape through a groove 172 in the piston rod 160 until the piston presses against the partition 158. Air now flows from the space 169, through by-pass 173 in valve 154, through passage 174, and out through the opening 175 which can be of any desired size to regulate the rate of rise of piston 162. In order that this opening 175 may be so large that it does not clog readily, the tank 170 is provided to supply air to the space 169 and thus slow down the reduction of pressure.

As soon as the piston 162 is lifted by the greater pressure beneath it, this pressure escapes through the opening 164 and this reduction of pressure is slowly distributed throughout the train-pipe and its connections, and the brakes respond thereto. But this reduction of pressure is immediately halted by the solenoid lifting the valve 148.

While the pressure in pipes 146 and 159 and in cylinders 144 and 156 dissipates very quickly through leakage, it may be found desirable to ensure this reduction by means of a permanent leak, consisting of a plug 177 connected at any desired point and having a minute discharge opening 178, which permanently drains the main pressure tank but is so small that the effect is practically negligible. Its size will determine how long after the lamp 128 indicates the picking-up of the track current, the brakes will be applied.

We claim:

1. In an air brake control device, a train-pipe and a control valve therefor, a cylinder and piston therein, a check valve adapted to prevent the flow of air from the control valve to the train-pipe, said check valve being normally held off its seat by said piston, a pipe connecting said cylinder to a source of air under pressure, and an electro-pneumatic valve to close said connection.

2. In an air brake control device adapted to be connected to the train-pipe of a vehicle, a cylinder connected to the train-pipe and a piston in said cylinder, a valve connected to the piston and normally closing a passage adapted to relieve the train-pipe pressure, said cylinder being formed to provide equal air pressure in both sides of the piston, a slide valve and passages controlled thereby to relieve the air pressure on one side of the piston so that the pressure on the other side may move the piston to cause the valve connected thereto to open a passage to relieve the train-pipe pressure, and an electro-pneumatic valve to control said slide valve.

3. In an air brake control device adapted to be connected to the train-pipe of a vehicle, a cylinder connected to the train-pipe and a piston in said cylinder, a valve connected to the piston and normally closing a passage adapted to relieve the train-pipe pressure, said cylinder being formed to provide equal air pressure on both sides of the piston to keep said passage closed, a slide valve to relieve the air pressure on one side of the piston so that the pressure on the other side may move the piston to cause the valve connected thereto to open said passage, a piston connected to said slide valve, a cylinder for the piston, a pipe connected to said piston and a source of air under pressure, and an electro-pneumatic valve connected into said pipe and controlling the flow of air therein.

4. In an air brake control device adapted to be connected to the train-pipe of a vehicle, a cylinder connected to the train-pipe and having a passage to permit the escape of air from said train-pipe, a valve connected to the lower side of the piston and normally held seated thereby to close said passage, said cylinder being formed with passages to admit train-pipe pressure to both sides of said piston, means to slowly relieve the pressure on the upper side of the piston to permit the pressure on the lower side of the valve to move the piston to unseat said valve, and an air container connected to the space above the valve to supply air to such space and thereby slow down the reduction of pressure above the valve.

5. In an air brake control device adapted to be connected to the train-pipe of a vehicle, a pressure controlled valve to relieve the air pressure in the train-pipe, a slide valve and a pressure controlled piston connected thereto to prevent the relief of said pressure, a cylinder for said piston, and an electro-pneumatic valve governing the admission of pressure to said cylinder.

6. In an air brake control device adapted to be connected to the train-pipe of a vehicle, a pressure controlled valve to relieve the air pressure in the train-pipe, a slide valve and a pressure controlled piston connected thereto to prevent the relief of said pressure, a cylinder for said piston, and an electro-pneumatic valve governing the admission of pressure to said cylinder, a second cylinder, a piston therein connected to said slide valve, and a conduit connecting to said train-pipe and to said second cylinder whereby train-pipe pressure may move said pistons and slide valve to permit train-pipe pressure to be relieved.

7. In an air brake control device adapted to be connected to the train-pipe of a vehicle, a cylinder connected to the train-pipe and a piston therein, said cylinder being formed with a valve chamber and with a passage connecting the space on one side of the piston to the train-pipe and to the outside air, with a second passage connecting the train-pipe to the valve chamber, with a third passage connecting the valve chamber to the space in the other side of the piston, and with a fourth passage connecting the valve chamber to the outside air, a valve connected to the piston and normally held thereby to close the first passage to the outside air, a second valve to normally close the fourth passage, a second piston to hold said second valve in normal position, a cylinder for said second piston, a conduit connecting said second cylinder to a source of air under pressure, an electro-pneumatic valve to open and close said conduit, a third cylinder connected to said valve chamber, and a third piston therein connected to said second valve and adapted to move it to connect said third and fourth passages when said conduit is closed by said electro-pneumatic valve.

THOMAS E. CLARK.
CHARLES B. STONE.